(12) United States Patent
Avril et al.

(10) Patent No.: US 8,861,640 B2
(45) Date of Patent: Oct. 14, 2014

(54) TRANSMISSION METHOD TAKING ECHO INTO ACCOUNT

(75) Inventors: Gautier Avril, Saint Aubin de Scellon (FR); Pascal Pagani, Guingamp (FR)

(73) Assignee: Orange, Paris (FR)

( * ) Notice: Subject to any disclaimer, the term of this patent is extended or adjusted under 35 U.S.C. 154(b) by 201 days.

(21) Appl. No.: 13/120,706

(22) PCT Filed: Sep. 28, 2009

(86) PCT No.: PCT/FR2009/051837
§ 371 (c)(1),
(2), (4) Date: Mar. 24, 2011

(87) PCT Pub. No.: WO2010/037957
PCT Pub. Date: Apr. 8, 2010

(65) Prior Publication Data
US 2011/0170633 A1    Jul. 14, 2011

(30) Foreign Application Priority Data
Sep. 30, 2008   (FR) ...................................... 08 56601

(51) Int. Cl.
*H04K 1/02* (2006.01)
*H04L 5/00* (2006.01)
*H04B 3/46* (2006.01)
*H04L 25/03* (2006.01)

(52) U.S. Cl.
CPC .............. *H04B 3/468* (2013.01); *H04L 5/0044* (2013.01); *H04L 5/0058* (2013.01); *H04L 25/03343* (2013.01)
USPC .......... 375/296; 375/219; 375/222; 375/133; 375/260; 370/344; 370/468

(58) Field of Classification Search
USPC ................................... 375/296, 260, 222, 133
See application file for complete search history.

(56) References Cited

U.S. PATENT DOCUMENTS

| | | | | |
|---|---|---|---|---|
| 5,479,447 | A * | 12/1995 | Chow et al. | 375/260 |
| 6,292,559 | B1 | 9/2001 | Gaikwad et al. | |
| 7,558,315 | B2 * | 7/2009 | Cioffi et al. | 375/222 |
| 2002/0044597 | A1 * | 4/2002 | Shively et al. | 375/222 |
| 2004/0264559 | A1 * | 12/2004 | Cendrillon et al. | 375/219 |
| 2005/0063323 | A1 | 3/2005 | Schenk | |
| 2005/0152442 | A1 * | 7/2005 | Duvaut et al. | 375/222 |
| 2007/0280334 | A1 * | 12/2007 | Lv et al. | 375/133 |

FOREIGN PATENT DOCUMENTS

| | | |
|---|---|---|
| DE | 100 59 174 A1 | 6/2002 |
| WO | WO 2005/071853 A1 | 8/2005 |

* cited by examiner

*Primary Examiner* — Eva Puente
(74) *Attorney, Agent, or Firm* — Drinker Biddle & Reath LLP

(57) ABSTRACT

A transmission method and device are provided for taking account of an echo. The method and the device adapt the send power mask to take account of an echo's power estimated on the basis of an echo function, the echo being due to the transmission by a transmission channel of a sequence sent by the sender device.

12 Claims, 4 Drawing Sheets

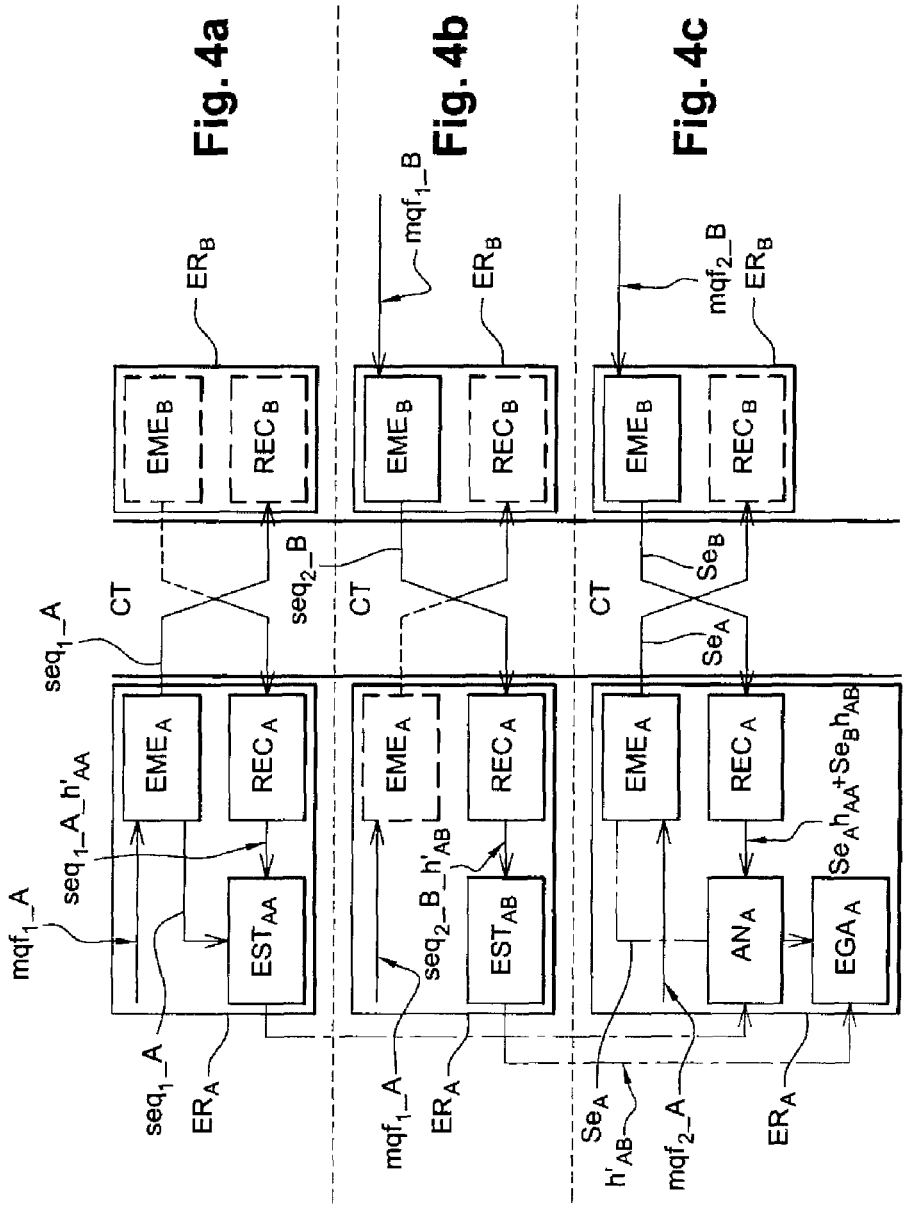

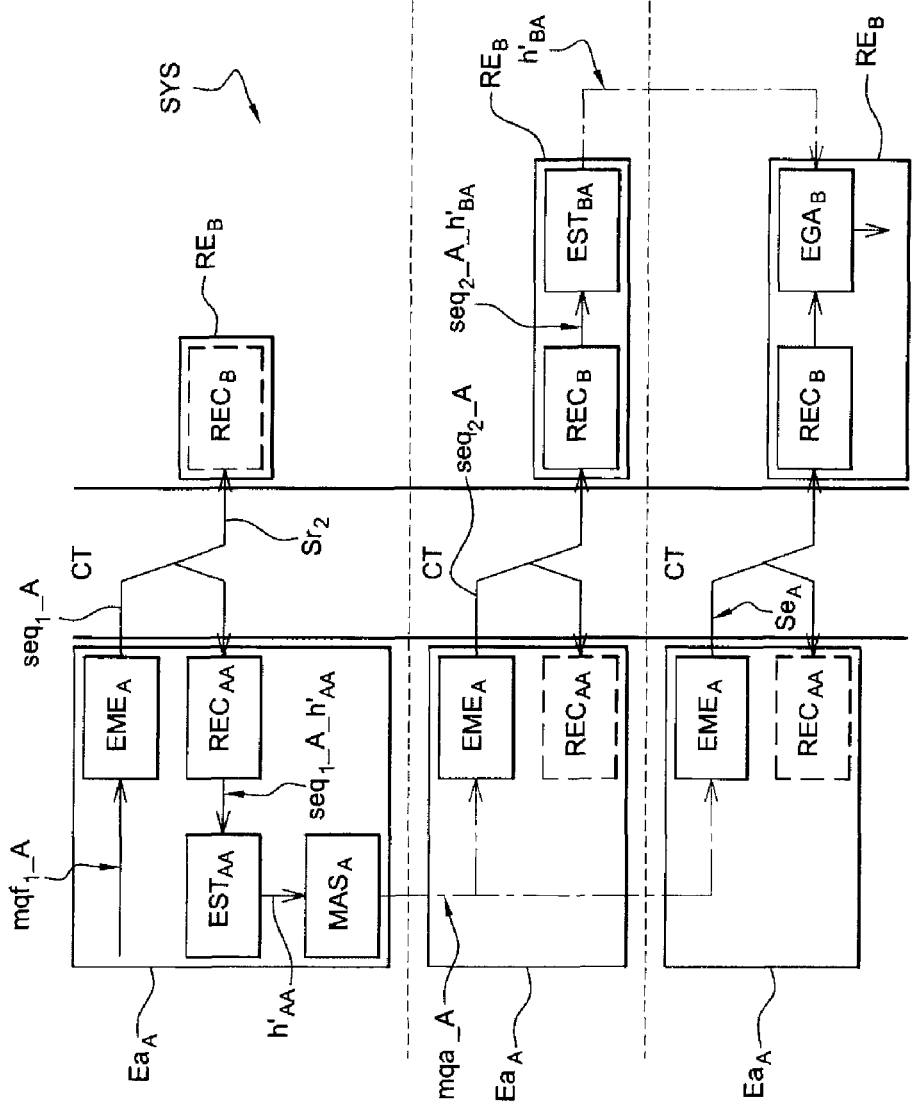

TRANSMISSION METHOD TAKING ECHO INTO ACCOUNT

CROSS-REFERENCE TO RELATED APPLICATIONS

This application is the U.S. national phase of the International Patent Application No. PCT/FR2009/051837 filed Sep. 28, 2009, which claims the benefit of French Application No. 08 56601 filed Sep. 30, 2008, the entire content of which is incorporated herein by reference.

FIELD OF THE INVENTION

The present invention pertains to the field of telecommunications. Within this field, the invention pertains more particularly to so-called digital communications.

BACKGROUND

Digital communications comprise, in particular, wire-based communications. The transmission of the communication is performed through a transmission channel sometimes called a propagation channel which links a sender and a receiver. The transmission channel corresponds to the physical link between the sender and the receiver. This link is defined by certain parameters and especially by the nature of the link (wire-based, radio, etc.). Certain intermediate equipment such as couplers or repeaters are considered to form part of the transmission channel. Indeed, this equipment participates solely in the transmission of the physical signal and is transparent from the point of view of the senders and receivers.

The invention considers the context of a system comprising at least one sender device A having local reception capabilities and a remote receiver B. The transmission channel is defined for each sender-remote receiver pair. In a broadcast use, with one sender and several receivers, there are as many transmission channels as receivers.

The transmission may be subjected to various phenomena and especially to reflection phenomena. The signal sent by the sender device is reflected, typically at the level of the terminations and junctions for a wire-based channel or at the level of obstacles for a radio channel. These reflections imply that a part of the power sent by the sender device returns to the level of the sender device. We will use the term echo to designate this returned power at the level of the sender.

The transmission channel between a sender A and a receiver B may be characterized by a set of transfer functions which make it possible to determine the effect of the channel on a signal sent by the sender A: $h_{AA}$, $h_{BA}$. In a conventional manner, a transfer function is a series of complex values which express the attenuation and the phase shift of the signal for each frequency. Thus, the transfer function $h_{BA}$ makes it possible to determine the signal received at the point B as a function of the signal sent at the point A while applying an attenuation and a phase shift for the whole set of frequencies. Also, the transfer function $h_{AA}$ makes it possible to determine the signal received at the point A as a function of the signal sent at the point A.

Hereinafter in the document, the transmission function from A to B is called $h_{BA}$ and the echo function from A to A is called $h_{AA}$. These functions may be variable as a function of frequency.

The invention is applied more particularly to line carrier current transmission, commonly designated by the initials PLT (Power Line Transmission). According to this application, the reflections occur in particular at the electrical interfaces, typically at the level of the wall sockets, branch panels etc. FIG. 1 pertains to a particular electrical installation comprising a sender and a remote receiver. FIG. 1 illustrates the level of the amplitude of the echo function, expressed in dB, at the level of the sender, in the case of a PLT transmission destined for the remote receiver.

The invention is, however, not limited to this type of transmission by carrier current and can find application to other types of wire-based transmission as well as to non-wire-based transmissions, in particular aerial transmissions.

Telecommunication systems are conventionally implemented in a context of national or international regulation. A regulating authority defines a maximum permitted power level $P_{lim,f}$ which is generally translated into the form of a send mask. This mask is fixed and imposes the power of the signal sent $P_f$. An exemplary fixed send mask is illustrated by FIG. 2. It is associated with the systems in accordance with the HomePlugAV specification defined by a group of members and accessible at the following Internet address http://www.homeplug.org. FIG. 3 illustrates the send mask associated with the systems in accordance with the SDSL standard of the ITU.

With reference to FIGS. 4a, 4b, 4c, a known full-duplex multicarrier digital communication system of SDSL type comprises a sender/receiver device $ER_A$ and a remote sender/receiver device $ER_B$, that are separated by a transmission channel CT.

The multicarrier signal sent has a power spectral density distributed over the send band split up into carriers according to the characteristics of the telecommunication system.

FIGS. 4a, 4b, 4c represent in a schematic manner certain modules of the sender/receiver device $ER_A$ and of the sender/receiver device $ER_B$, for various instants of a process of sending a multicarrier signal between the sender/receiver device $ER_A$ and the sender/receiver device $ER_B$. The sender/receiver device $ER_A$ comprises a send module $EME_A$, a receive module $REC_A$, a module $EST_{BA}$ for estimating the transmission function $h_{BA}$, a module $EST_{AA}$ for estimating the echo function $h'_{AA}$, an echo cancellation module $AN_A$, a channel equalization module $EGA_A$. The sender/receiver device $ER_B$ comprises a send module $EME_B$, a receive module $REC_B$.

Upon the sending of a first particular multicarrier sequence $seq_1\_A$ by the send module $EME_A$, FIG. 4a, at a power level determined according to a fixed power mask $mqf_1\_A$, the transmission channel CT transmits the signal sent, a part of which is received by the receive module $REC_B$. A part of the power of the signal sent is returned and received by the receive module $REC_A$. This part corresponds to the signal sent $seq_1\_A$ attenuated and phase-shifted for the set of frequencies by the echo function $h'_{AA}$. The estimation module $EST_{AA}$ estimates this echo function knowing the signal sent $seq_1\_A$ and the returned signal received $seq_1\_A\_h'_{AA}$ provided by the receive module $REC_A$.

Upon the sending of a second particular multicarrier sequence $Seq_2\_B$, FIG. 4b, known to the sender/receiver device $ER_A$, at a power level determined according to a fixed power mask $mqf_1\_B$, by the send module $EME_B$ of the sender/receiver device $ER_B$, the signal transmitted by the transmission channel CT is received by the receive module $REC_A$ of the sender/receiver device $ER_A$. This received signal corresponds to the second sequence $Seq_2\_B$ attenuated and phase-shifted for the set of frequencies by the transmission function $h'_{AB}$. The estimation module $EST_{AB}$ estimates this transmission function $h'_{AB}$ knowing the second particular multicarrier sequence $seq_2\_B$ and the transmitted signal received provided $seq_2\_B\_h'_{AB}$ by the receive module $REC_A$.

During a full-duplex transmission, FIG. 4c, each of the two send modules $EME_A$ and $EME_B$ of the sender/receiver devices respectively $ER_A$ and $ER_B$ simultaneously send a multicarrier signal $Se_A$, $Se_B$, at a power level determined according to a respective fixed power mask $mqf_2\_A$, $mqf_2\_B$. The receive module $REC_A$ of the sender/receiver device $ER_A$ receives the signal transmitted by the transmission channel CT on account of the send by the sender/receiver device $ER_B$ and the echo on account of the simultaneous send by the sender/receiver device $ER_A$. The echo cancellation module $AN_A$ cancels this echo of the signal received. The cancellation consists in subtracting the echo received from the signal received $Se_A \times h_{AA} + Se_B \times h_{AB}$ provided by the receive module $REC_A$. To evaluate the echo received $Se_A\_h_{AA} = Se_A \times h_{AA}$, the cancellation module $AN_A$ makes the approximation that the echo function $h_{AA}$ is identical to the echo function $h'_{AA}$ estimated during the sending of a first known sequence. The cancellation module $AN_A$ therefore subtracts the signal sent $Se_A$ attenuated and phase-shifted for the set of frequencies by $h'_{AA}$, from the signal received. The channel equalization module $EGA_A$ evaluates the signal sent $Se_B$, for example by dividing the signal provided at the output of the cancellation module $AN_A$ by the coefficient $h'_{AB}$. The equalization module $EGA_A$ makes the approximation that the transmission function $h_{AB}$ is identical to the transmission function $h'_{AB}$ estimated during the sending of a second particular sequence $seq_2\_B$.

In this known multicarrier digital communication system of SDSL type, the echo cancellation module intervenes during communications in full-duplex mode.

The PEB 22622 (SOCRATES) component from the company Infineon is adapted for an SDSL system and comprises the modules of a previously described sender/receiver device.

The echo, resulting from the reflection phenomenon occurring during transmission, may disturb the receive module of a sender/receiver device, in a full-duplex mode. To combat this disturbance, the receive module of the sender/receiver device cancels the echo, by means of an echo cancellation module, by estimating the echo by taking account of a previously estimated echo function and of the signal sent.

As regards the signal received by the receive module of a remote sender/receiver device, it is diminished with respect to the signal sent by the power of the echo.

SUMMARY

The invention proposes to combat the loss of power between the signal sent by the sender/receiver device and the signal received by the remote receiver.

The subject of the invention is a method for sending a multicarrier signal using a send power mask, the signal sent being transmitted by a transmission channel separating a sender device having means of reception from a remote receiver, which comprises:

adapting the send power mask by taking account of an echo function, the echo being due to the transmission of a sequence sent by the sender device and known to the reception means, so as to take account of the power lost because of the echo.

By replacing the fixed power mask with an adapted power mask of higher level, the power received by the remote receiver is greater than that received in the absence of adapted mask, thereby making it possible to increase the throughputs and/or the service quality.

Furthermore, the subject of the invention is a device sending a multicarrier signal implementing a send power mask, the signal sent being transmitted by a transmission channel separating the sender device from a remote receiver, which comprises at least:

a receive module suitable for receiving an echo corresponding to a known sequence, a send module for sending the known sequence, a module for estimating an echo function characterizing a channel transmitting the echo, echo due to the transmission of the known sequence, a module for adapting the power mask so as to take account of the echo power estimated on the basis of the echo function.

Furthermore, the subject of the invention is a telecommunication system comprising a sender device according to the previous subject and a remote receiver device, a transmission channel separating the sender device and the remote receiver.

By replacing the fixed power mask with an adapted power mask, a device and a system according to the invention make it possible to increase the power received by the remote receiver by taking account of the loss of power, on account of the power of the echo, when determining the power to be sent.

The method, the sending device and the system in accordance with the invention make it possible to combat the effect induced by the echo. Indeed, by taking account of the power of the echo in order to adjust the power sent, the signal received by the remote receiver benefits from a maximum power level. Thus, the signal is sent with a greater power level than the power level received by the receiver so as to take account of the power returned because of the echo.

According to a particular embodiment, the method furthermore comprises:

sending the known sequence by the sender device, for transmission by the transmission channel, estimating the echo function, by the reception means, by evaluating the ratio between the known sequence sent and the sequence received by the reception means.

The sending of a known sequence and the estimation of the echo function may be implemented previously, in a systematic or occasional manner, to the power adaptation. They can take place during a phase of initialization of the sender device thereby making it possible to optimize the communication time. They can equally well take place at other instants so as to allow updating of the send mask.

As regards the latter particular embodiment, the sending of the known sequence, the estimation of the echo function and the adaptation of the power mask may be performed regularly at instants determined in conjunction with the instants of sending of a communication signal by the sender device.

By synchronizing the instants of sending of the determined sequence, and therefore of estimation of the echo function, and the instants at which the sender device sends a signal corresponding to communication data, this makes it possible to take account of the alterations in the characteristics of the transmission channel, which result in a modification of the echo function $h_{AA}$, during the sending of the signal.

According to a particular embodiment, the known sequence corresponds to all or part of a communication signal sent by the sender device.

The use of the data makes it possible very advantageously to limit the throughput losses due to the dispatching of a predetermined sequence not transporting any useful data.

According to a particular embodiment, the power mask is adapted per carrier.

This makes it possible to take account of the fact that the transmission channel may vary as a function of frequency and/or that the amplification of the sender may be dependent on frequency.

According to a particular embodiment, several power masks are defined and selected in a periodic manner.

In particular, the selection is performed in a periodic manner with respect to the cycle of the voltage of the electrical mains which supplies the sender device. This makes it possible to take account of the periodic variations, of the echo function, which are synchronous with the mains electrical voltage (50 Hz for example).

According to a particular embodiment, the adaptation of the power mask takes account of a periodic variation of the echo function, by taking into account, for a given frequency, a minimum value over the period of the set of echo functions.

This makes it possible to take account of the periodic variations which are synchronous with the mains voltage (50 Hz for example) of the echo function by ensuring that the power sent never exceeds the mask considered.

According to a particular embodiment, the adapted power mask is determined by adding to a fixed power mask an estimated power of the echo.

This determination makes it possible to optimize the power of the signal received by sending at least the power corresponding to a fixed mask, increased if necessary, to compensate for the power of the echo. This makes it possible to take into account a constraint which is typically associated with a national or international regulating entity which determines a maximum level of power received.

According to a particular embodiment, the adapted power mask is bounded to a maximum value on all or part of the frequencies.

This limitation makes it possible to take into account a limitation of the system's amplifying capabilities.

According to a particular embodiment, the adapted send power is limited by a margin taking into account an error of estimation of the echo function.

This limitation makes it possible to take into account an error of estimation of the echo function.

The various previous embodiments may or may not be combined with one or more of these modes to define another embodiment.

BRIEF DESCRIPTION OF THE DRAWINGS

Other characteristics and advantages of the invention will be apparent during the description which follows offered in relation to appended figures given by way of nonlimiting examples.

FIGS. 4a, 4b, 4c, schematically represent a known multicarrier digital communication system of SDSL type comprising a sender/receiver device $ER_A$ and a remote sender/receiver device $ER_B$, which are separated by a transmission channel CT.

FIGS. 7a, 7b, 7c, schematically represent an example of a multicarrier digital communication system adapted according to the invention comprising a sender/receiver device $ER_A$ adapted according to the invention and a remote sender/receiver device $ER_B$, which are separated by a transmission channel CT.

DETAILED DESCRIPTION

A module represented in various figures with one and the same reference affords the same function.

Figure 5:
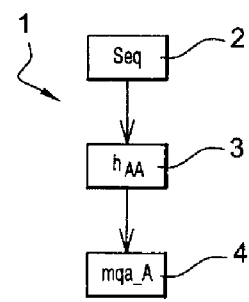
FIG. 5 is a flowchart of a particular implementation of a method according to the invention.

With reference to FIG. 5, a method for sending a multicarrier signal, according to the invention, uses a power mask. The signal sent is transmitted by a transmission channel separating a sender device A having means of reception from a remote receiver B. FIG. 5 illustrates a particular implementation of a method according to the invention.

The method 1 comprises a sending 2 of a known sequence, an estimation 3 of the echo function and an adaptation 4 of the power mask. The sending 2 and estimation 3 steps can be implemented only during a phase of initialization of the sender device. In this case, the sending method according to the invention then only implements the adaptation of the mask outside of the initialization phase. According to other implementations, the adaptation step 4 may be preceded by the sending 2 and estimation 3 steps in a systematic or non-systematic manner, in particular, only under certain conditions such as a change of configuration parameters of the sender device (for example a change of RF frequency (radio frequency), a change of duration of sent symbols, etc.) or upon detecting a change of the characteristics of the transmission channel.

Furthermore, the method can comprise other actions as a function of the embodiments.

The sending 2 of a known sequence Seq is performed by the sender device having reception means.

The transmission of this sequence Seq on the transmission channel may be subject to various attenuation and reflection phenomena which result in an echo.

The echo function of the transmission channel $h'_{AA}$, due to the transmission of the known sequence Seq, is estimated 3 by the sender device with the aid of its reception means and of their knowledge of the sent sequence Seq. In the case where the channel is liable to undergo periodic variations, and especially periodic variations synchronous with the voltage of the electrical mains, the method can in a complementary manner determine the alteration over time of the echo function in the course of this period. And for various instants, the method determines various power masks adapted to the echo function corresponding to this instant. Furthermore, the method can determine a minimum echo function, corresponding for each frequency to the minimum value of the echo functions for the set of phase values of the mains voltage, therefore a minimum value of the various echo functions determined over a period.

The sequence Seq may be either a sequence specially designed to determine the channel echo function, or a sequence of data sent during the transmission of a communication signal from A to B.

Figure 1:
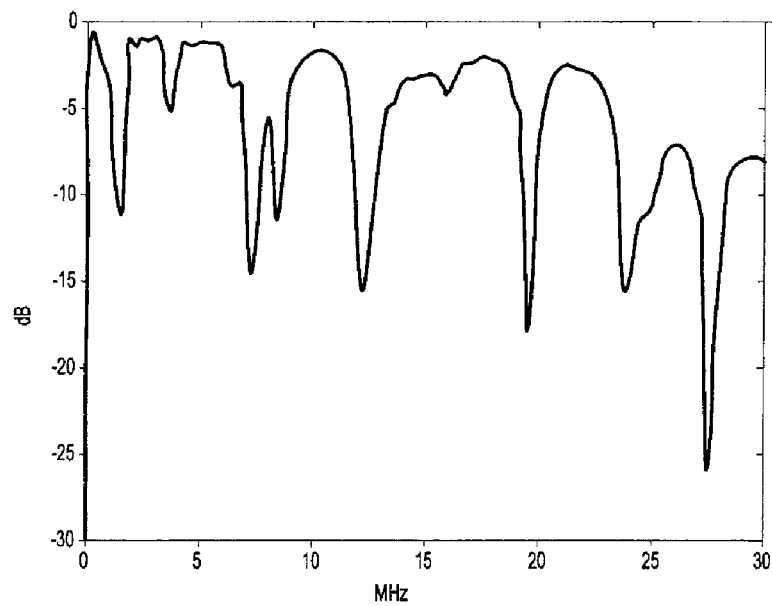
FIG. 1 is the graphical representation of a channel reflection observed between a sender and a receiver in a particular residence during a communication of PLT type.
Figure 3:
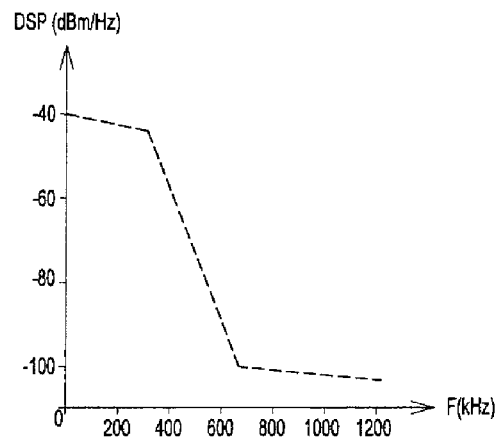
FIG. 3 is the graphical representation of a fixed power mask in accordance with the SDSL standard.
Figure 2:
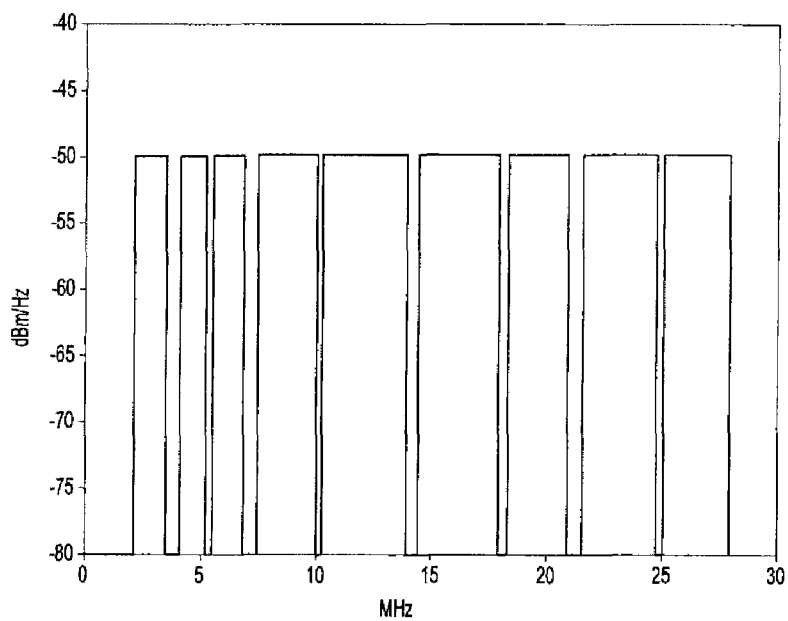
FIG. 2 is the graphical representation of a fixed power mask in accordance with the HomePlugAV specification.

The power mask used to send a communication signal is adapted 4 to take account of the power of an echo estimated on the basis of the echo function. Typically, the sender device sends a signal with a determined power such that the power received at any point of the electrical network cannot exceed a certain power mask, generally determined by a standard and/or a regulating body. Conventionally, the sender device sends in accordance with this fixed mask. FIG. 2 is the graphical representation of a fixed power mask in accordance with the HomePlugAV specification. FIG. 3 is the graphical representation of a fixed power mask in accordance with the SDSL standard.

The adaptation 4 of the mask according to the invention typically consists in increasing the level sent in relation to the fixed mask so as to take account of the power of an echo, estimated on the basis of the echo function $h'_{AA}$ applied to the signal sent.

The signal sent being multicarrier, the power mask is typically adapted in the frequency domain, per carrier. Typically, this adaptation consists in adding to the fixed mask the lost power returned by the echo, for a given carrier. This can be expressed by the equation:

$$Popt_f = Plim_f/(1-h'_{AA,f}) \quad (1)$$

with $Popt_f$ the power at the carrier f of the adapted mask in mW/Hertz, $Plim_f$ the power at the carrier f of the fixed mask in mW/Hertz, $h'_{AA,f}$ the amplitude in linear of the echo function of the transmission channel at the carrier f.

Figure 6:
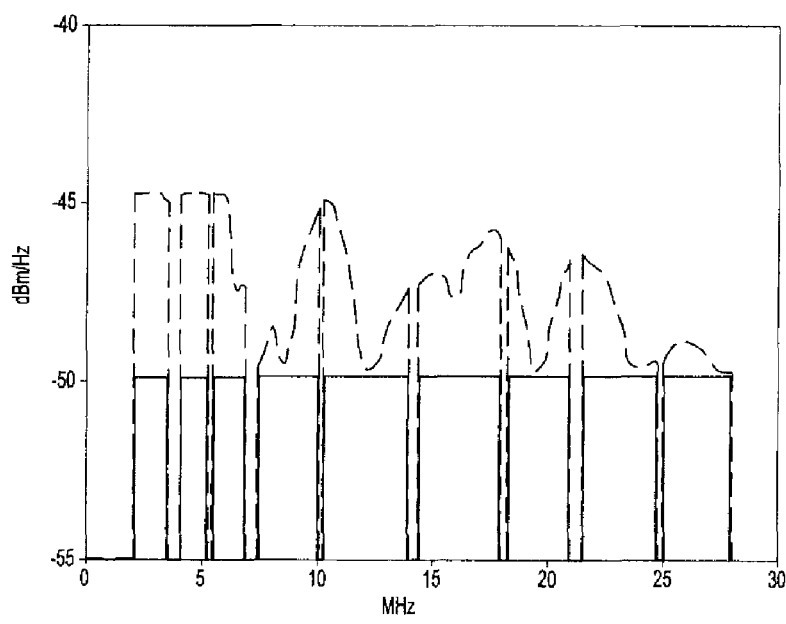
FIG. 6 represents an adapted power mask, the dashed curve corresponding to the fixed power mask of FIG. 2, in the case where the amplifying capability of the sender/receiver device is limited to −45 dBm/Hertz.

According to one embodiment, the sender device places a ceiling on the adapted power, for example to take account of its amplifying capabilities. The adapted power can be expressed in this case by the equation:

$$Popt_f = min(Plim_f/(1-h'_{AA,f}), Pmax_f) \quad (2)$$

with $Pmax_f$ the maximum power at the power f determined by the amplifying capabilities of the sender device in mW/Hertz. FIG. 6 represents an adapted power mask corresponding to the fixed power mask of FIG. 2, in the case where the amplifying capability of the sender/receiver device is limited to −45 dBm/Hertz. The adapted power mask corresponds to the dashed curve.

According to a particular embodiment, the adapted power is attenuated to take into account an error margin when estimating the echo function $h'_{AA}$.

FIGS. 7a, 7b, 7c, schematically represent an example of a multicarrier digital communication system SYS according to the invention, comprising an adapted sender device $Ea_A$ according to the invention and a remote receiver device $RE_B$, which are separated by a transmission channel CT. FIGS. 7a, 7b, 7c represent in a schematic manner certain modules of the adapted sender device $Ea_A$ and of the receiver device $RE_B$ for various instants of a process for sending a multicarrier signal between the adapted sender device $Ea_A$ and the receiver device $RE_B$.

The adapted sender device $Ea_A$ comprises a send module $EME_A$, a receive module $REC_{AA}$, a module $EST_{AA}$ for estimating the echo function from A to A, a module for calculating an adapted power mask $MAS_A$. The receiver device $RE_B$ comprises a receive module $REC_B$, a module for estimating the transmission function from A to B ($EST_{BA}$) and an equalization module $EGA_B$.

Upon the sending of a first multicarrier sequence $Seq_1\_A$ by the send module $EME_A$, FIG. 7a, at a power level determined typically according to a fixed power mask $mqf_1\_A$, the transmission channel CT transmits the signal sent, a part of which is received by the receive module $REC_B$. A part of the power of the signal sent is returned and received by the receive module $REC_{AA}$. This part corresponds to the signal sent $seq_1\_A$ attenuated and phase-shifted for the set of frequencies by the echo function $h'_{AA}$ corresponding to the instant of sending of the signal sent. The estimation module $EST_{AA}$ estimates this echo function knowing the signal sent $seq_1\_A$ and the returned signal received provided $seq_1\_A\_h'_{AA}$ by the receive module $REC_{AA}$.

The sender device $Ea_A$ is adapted in that the receive module $REC_{AA}$ can consist of reception means adapted and limited to receiving the echo and in that it comprises a module for calculating an adapted power mask $MAS_A$. The power mask used to send a communication signal is adapted so as to take account of the power of an echo estimated on the basis of the echo function $h'_{AA}$. The calculation of the adapted mask mqa_A performed by the module $MAS_A$ typically consists in increasing the level sent in relation to a fixed mask so as to take account of the power of an echo, estimated on the basis of the echo function $h'_{AA}$ applied to the signal sent.

The signal sent being multicarrier, the calculation of the power mask performed by the module $MAS_A$ is typically performed in the frequency domain, per carrier. Typically, this calculation consists in adding to the fixed mask the estimated power of the echo, for a given carrier. This can be expressed by equation (1).

According to one embodiment of the adapted sender device $Ea_A$, the sender device $Ea_A$ places a ceiling on the adapted power for example to take account of its amplifying capabilities. The adapted power can be expressed in this case by equation (2).

Upon the sending of a second multicarrier sequence $Seq_2\_A$, FIG. 4b, known to the receiver device $RE_B$, at a power level determined according to the adapted power mask mqa_A, by the send module $EME_A$ of the sender device $Ea_A$, the signal transmitted by the transmission channel CT is received by the reception module $REC_B$ of the receiver device $RE_B$. This signal received corresponds to the second sequence $seq_2\_A$ attenuated and phase-shifted for the set of frequencies by the channel transmission function $h'_{BA}$. The estimation module $EST_{BA}$ estimates this transmission function from A to B $h'_{BA}$ knowing the second multicarrier sequence $seq_2\_A$ and the transmitted signal received provided $seq_2\_A\_h'_{AB}$ by the receive module $REC_B$.

Upon a transmission of communication data from the adapted sender device $Ea_A$ to the receiver device $RE_B$, FIG. 7c, the send module $EME_A$ sends a multicarrier signal $Se_A$, at a power level determined according to the adapted power mask mqa_A. The receive module $REC_B$ of the receiver device $RE_B$ receives the signal transmitted by the transmission channel CT. The channel equalization module $EGA_B$, of the receiver device $RE_B$, evaluates the signal sent $Se_2$ by dividing the signal provided $Se_A \times h_{BA}$ by the receive module $REC_B$ by the coefficient $h'_{BA}$ estimated upon the sending of a second sequence $seq_2\_A$. The equalization module $EGA_B$ makes the approximation that the echo function $h_{BA}$ is identical to the echo function $h'_{BA}$ determined upon the sending of the second sequence.

According to a particular embodiment, the receive module $REC_{AA}$ of the sender device $Ea_A$ is identical to that used to receive data in half duplex or in full duplex in the case illustrated by FIGS. 4a, 4b and 4c which corresponds to a transmission of data between two sender/receiver.

The send module $EME_A$ of the sender device $E_{aA}$ of FIG. 7a, used for the estimation of the channel echo function, is considered in the foregoing description to be the same module as that used for the estimation of the transmission function of FIG. 7b and as that used for the transmission of data of FIG. 7c. According to another embodiment, this may involve a degraded sender, that is to say one intended solely to send a sequence used to evaluate the echo function $h'_{AA}$ of the channel.

According to a particular embodiment, all the sequences of communication data sent by the sender device $E_{aA}$, or only some of them, may be used to estimate the echo function of the channel, permanently or in an occasional manner. According to this mode, the first sequence $seq_1\_A$ is a data sequence and it is known to the receive module $REC_{AA}$. Regular and frequent estimation of the echo function, possible by using the data sequences without loss of transmission throughput, makes it possible to rapidly adjust the send power, according to the calculation provided by the module $MAS_A$, after detecting a noticeable modification of the echo function $h'_{AA}$.

The invention claimed is:

1. A method for sending a multicarrier signal using a transmit power mask, the signal sent being transmitted by a transmission channel separating a sender device having a receiver to receive from a remote receiver, which comprises:
   adapting the transmit power mask by increasing said transmit power mask with an estimation of an echo function, which characterizes an echo, said echo being a reflected signal received by the receiver and caused by the transmission of a signal sent by the sender device on the transmission channel, so as to take account of the power lost because of the echo.

2. The sending method as claimed in claim 1, further comprising:
   sending a known sequence by the sender device, for transmission by the transmission channel, and
   estimating the echo function, by the receiver, by evaluating a ratio between the known sequence sent and the sequence received by the receiver.

3. The sending method as claimed in claim 2, wherein the sending of the known sequence, the estimation of the echo function, and the adaptation of the power mask are performed regularly at instants determined in conjunction with the instants of sending of a communication signal by the sender device.

4. The sending method as claimed in claim 2, wherein the known sequence corresponds to all or part of a communication signal sent by the sender device.

5. The sending method as claimed in claim 1, wherein the transmit power mask is adapted per carrier.

6. The sending method as claimed in claim 1, wherein several transmit power masks are defined and selected in a periodic manner.

7. The sending method as claimed in claim 1, wherein the adaptation of the power mask takes account of a periodic variation of the echo function, by taking into account, for a given frequency, a minimum value of the power of an echo at said given frequency over the period.

8. The sending method as claimed in claim 1, wherein the adapted transmit power mask is determined by adding an estimated power of the echo to a fixed transmit power mask.

9. The sending method as claimed in claim 1, wherein the adapted transmit power mask is bounded to a maximum value on all or part of the frequencies.

10. The sending method as claimed in claim 1, wherein the adapted transmit power mask is limited by a margin taking into account an error of estimation of the echo function.

11. A device for sending a multicarrier signal implementing a transmit power mask, the signal sent being transmitted by a transmission channel separating the sender device from a remote receiver, which comprises at least:
    a receive module for receiving an echo corresponding to a reflected signal caused by the transmission of a signal sent by the sender device on the transmission channel,
    a send module for sending a signal on the transmission channel,
    a module for estimating an echo function characterizing the echo, and
    a module for adapting the transmit power mask, by increasing said transmit power mask according to the estimation of the echo function, so as to take account of the power lost because of the echo.

12. A telecommunication system comprising a sender device as claimed in claim 11 and a remote receiver device, the transmission channel separating the sender device and the remote receiver.

* * * * *